Oct. 25, 1938.　　　R. H. DRAEGER　　　2,133,978
COPYING APPARATUS
Filed July 27, 1936　　　5 Sheets-Sheet 3

INVENTOR.
RUPERT H. DRAEGER.
BY
ATTORNEYS.

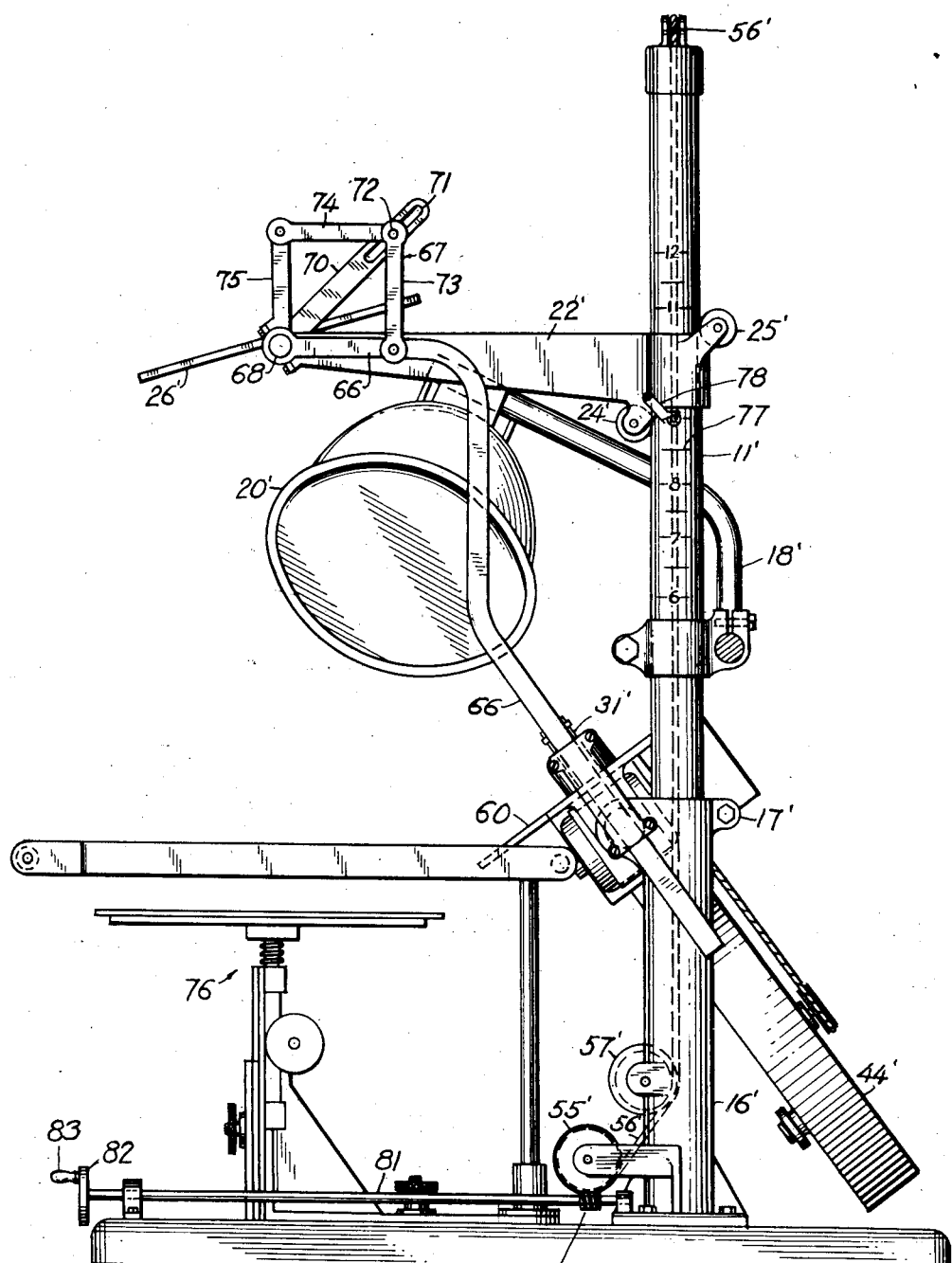

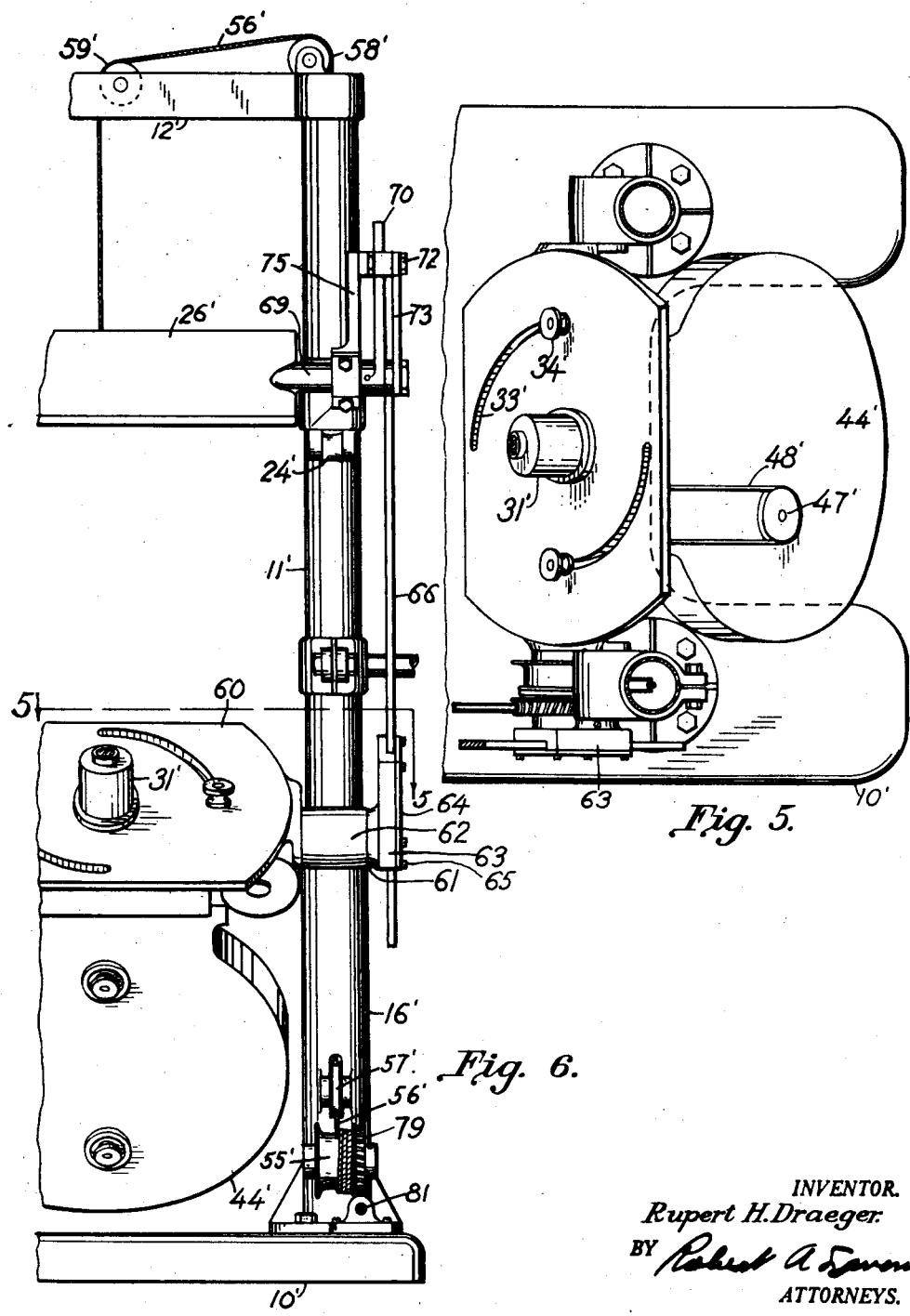

Patented Oct. 25, 1938

2,133,978

UNITED STATES PATENT OFFICE 2,133,978

COPYING APPARATUS

Rupert H. Draeger, United States Navy

Application July 27, 1936, Serial No. 92,745

11 Claims. (Cl. 88—24)

(Granted under the act of March 3, 1883, as amended April 30, 1928; 370 O. G. 757)

This invention relates in general to copying apparatus and particularly to reflex camera devices especially suited for the copying of books, printed matter, drawings and other objects which lie substantially in a plane.

Heretofore, devices of this nature have generally been adapted to utilize large rolls of sheet material such as paper, or comparatively large glass plates, or cut films, for the surface upon which the negative was made. In copying cameras that use the former, the strip material is of constant width and hence the copying of objects of various sizes is wasteful of the material as it is generally impractical to arrange the various objects to be copied so that their images exactly fill the field of the camera. Furthermore, arrangement of the objects to fill the field cannot be attempted unless a constant ratio of object size to image size is satisfactory for all of the several objects to be copied at one exposure. As for copying cameras that utilize sensitized glass plates, such material is not only expensive, but troublesome to load into proper holders and difficult to process in quantity. Where it is desired to preserve negatives made on glass plates, the costs may be prohibitive since the plates are bulky, heavy and liable to become broken. Copying cameras which utilize cut films are also uneconomical because of the expense of handling film holders and processing individual films. Copying cameras of each of these types have been large and heavy, the camera elements having been positioned above the work to be copied. Consequently, such devices have required a large space and have been impractical to move about.

Since the motion picture industry has created a substantial demand for a standardized film, the most uniformly high quality sensitized material available at reasonable prices is thirty-five millimeter movie film. The positive emulsion used on standard movie film is susceptible to very fine grain development and is therefore very satisfactory for the production of miniature contrast negatives. This film has been recently used in cameras developed for copying purposes and is establishing itself in this class of work.

Copying cameras utilizing standard thirty-five millimeter motion picture film have many advantages over the older types of copying cameras. Among these advantages are the ease of loading, the relatively large quantity of film that may be loaded at one time, the comparatively small size and the great portability of the complete camera apparatus. Although the project of such cameras is a negative, it is small, easy to store, inexpensive, and relatively easy to process. Another advantage is the fact that when consecutive pages of a book are copied, they are kept in proper order on the negative film strip which may be processed in long lengths. Enlargements may be produced automatically from rolls of this film more easily than from other types of negatives. Likewise, contact positives on thirty-five millimeter film are easy to produce at high speed and a minimum expense. Enlarged positives on paper may be made in any desired size without wasting the photo-sensitized paper.

It is the object of the present invention to provide a complete copying unit utilizing standard roll film and having desirable automatic features described hereinafter.

It is the further object of this invention to provide a small copying unit having a reflector which permits utilization of a lens of comparatively long focal length whereby great accuracy is obtained and ready adjustment of the film, lens and reflector positions is made possible for the copying of objects of various sizes at desired reduction ratios.

Another object of the invention is to provide interconnected means for assuring proper automatic positioning and optical alinement of the film, lens and reflector with respect to each other and with respect to the object or objects being copied as the camera is adjusted to secure a desired field size or reduction ratio.

Another object of the invention is to provide a copying unit of the character described having a camera and reflector adjusting means equipped with a calibrated scale for indicating the reduction ratio of a given adjustment and hence the size of the object that may be copied.

Another object of the invention is to provide a copying unit which is compact and light in weight and also precise in operation.

Another object of the invention is to provide a complete copying unit having its parts rigidly supported with a low center of gravity whereby the unit is readily portable and also sturdy.

Another object of the invention is to provide a copying unit having its film magazine at a convenient level for loading and permitting easy connection with automatic focussing, timing and film indexing mechanisms.

Another object of the invention is to provide a copying unit having means for adequately illuminating the object to be copied but with minimum glare and heat on the operator.

Another object of the invention is to provide a copying unit which may be readily operated by the average person and which may be manufactured economically.

Other objects and advantages of the invention will be readily apparent from the following detailed description of the embodiments thereof shown in the accompanying drawings, wherein:

Figure 4 is a side elevation view of a modified form of copying unit embodying this invention.

Figure 5 is a plan view, partly broken away, of the apparatus shown in Figure 4.

Figure 6 is a front elevation view, also partly broken away, of the modification shown in Figures 4 and 5.

Figure 1:
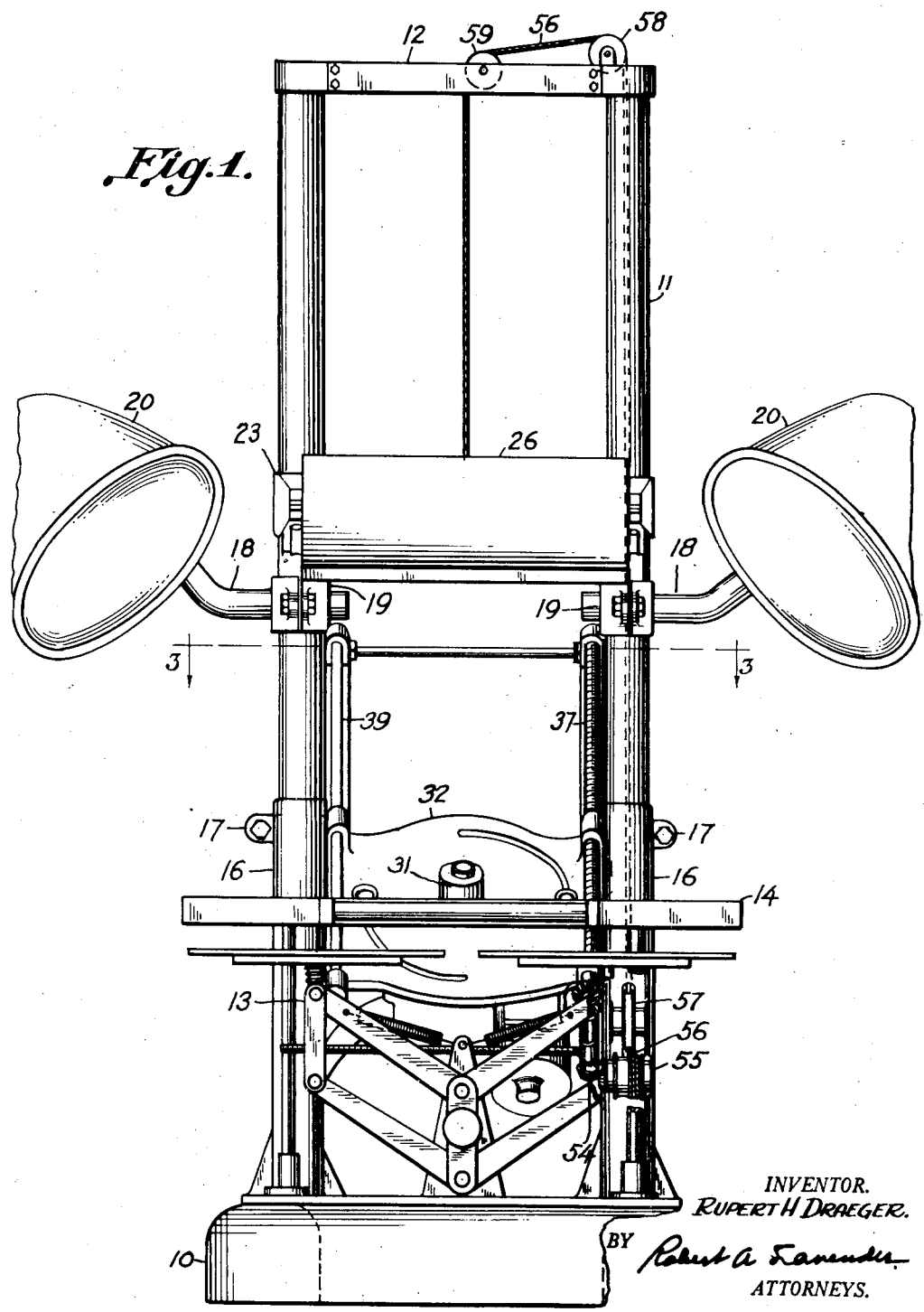
Figure 1 is a front elevation view of a copying unit embodying this invention.

Referring to the drawings, for the purposes of illustration, the base of the copying apparatus is indicated by the numeral 10. The base 10 is preferably a metal casting and is adapted to rest on a floor, table, stand or the like. A pair of hollow upwardly extending stanchions 16 are secured rigidly to the base 10. A pair of hollow standards 11 extend upward from and are removably clamped in the stanchions 16 by conventional clamps 17. The standards 11 are joined at their upper ends by a bridge or bar 12 securely fastened thereto to provide a rigid structure. An object holding device or platform 13 is supported on and secured to the top of the base 10 near the center thereof and in front of the stanchions 16. The object holder may be of any suitable construction and is preferably of the type shown and described in my copending application, Serial Number 55,000, filed December 19, 1935, and entitled "Book support." A hinged transparent panel or cover 14, of glass or the like, is provided over the object holder 13 for properly holding and positioning the object to be copied.

Figure 2:
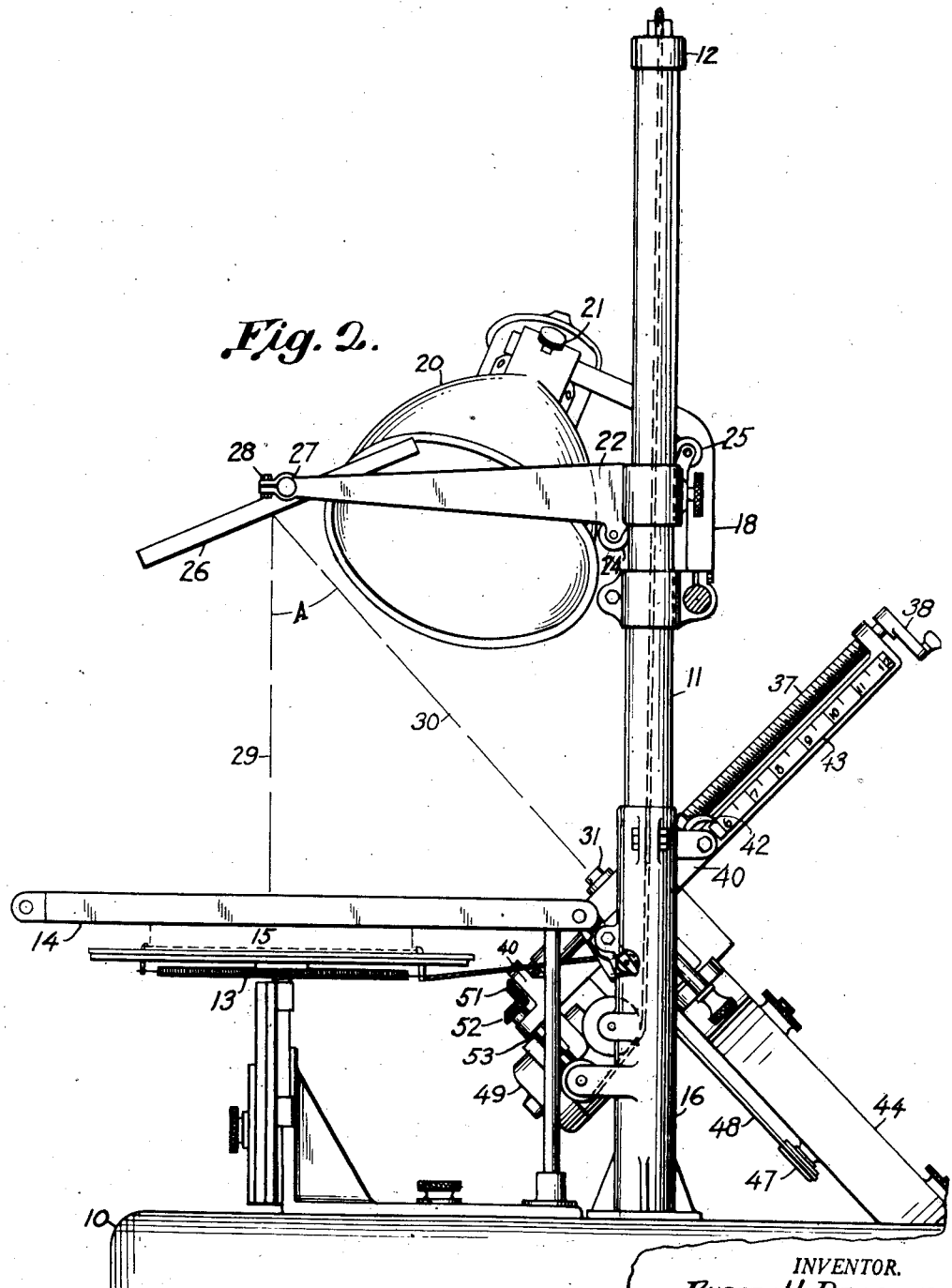
Figure 2 is a side elevation view of the apparatus shown in Figure 1.

A pair of lamps and reflectors 20 are adjustably supported on brackets 18 secured to the standards 11 by clamps 19. Thumb screws 21 (see Figure 2) may be used to secure the reflectors 20 to the brackets 18 in the proper position. The reflectors and lamps 20 are positioned at opposite sides of the standards 11 and adjusted to direct light forward and downward toward the object holder 13 and the panel 14. When properly adjusted the reflectors 20 insure ample illumination of the object to be copied, such as a book 15, without producing reflection or glare from the cover 14 in the eyes of an operator in front of the apparatus.

A horizontal arm or bracket 22 extends forward from each standard 11 and is adapted to be moved vertically along the standard on guide wheels 24 and 25. A bar or bridge 23 rigidly connects the arms 22 to each other and insures vertical movement of the two arms as a unit. A mirror or reflector 26 is adjustably secured to the forward ends of the arms 22 by trunnions 27 and clamps 28. The angular adjustment of the reflector 26 is such that light rays 29 reflected upward from the object to be copied are then reflected downward to the camera device 31, hereinafter described.

Figure 3:
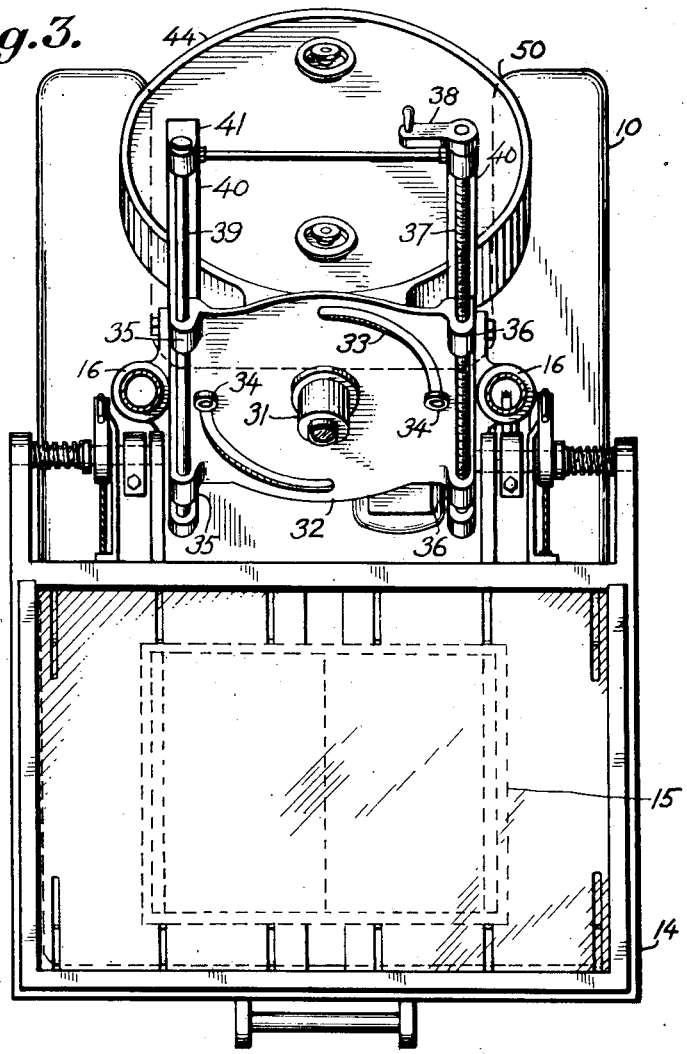
Figure 3 is a plan view of the apparatus taken on line 3—3 of Figure 1.

The camera 31 is supported on a plate 32 with its objective lens projecting through the plate toward the reflector 26. The supporting plate 32 is provided with quarter-circle slots 33. Suitable bolts, attached to the camera case, extend through the slots and are provided with thumb nuts 34, the camera being thus supported for axial movement through ninety degrees in order to permit exposures to be made crosswise or lengthwise of the camera film. The camera supporting plate 32 is slidably carried on the rods 37 and 39 by bosses 35 and 36. The rods 37 and 39 are in turn supported in bosses 41 of brackets 40 secured to the stanchions 16. The rod 37 and one of the bosses 36 are threaded so that the camera plate 32 may be moved along the rods 37 and 39 to any desired position by turning the crank 38 secured to the threaded rod 37. A pointer 42 secured to the camera plate 32 and a scale 43 on the rod support 40 indicate the adjusted position of the camera. The camera includes a roll film magazine 44, being removably secured to the lower side of the camera. The rear of the apparatus base 10 may be cut away as at 50 (see Figure 3) to provide space for the magazine 44 when the camera is adjusted to its lowermost position. A detachable belt 48 connects the pulley 47 of the film magazine to a motor 49, carried by the camera case, for operating the shutter and indexing the film strip when desired.

The lower end of rod 37 is provided with a bevel gear 51 which engages gear 52 on shaft 53, the shaft 53 being geared at 54 to a spindle or drum 55 journaled on the stanchion 16. A cable 56 is wound on the drum 55 and extends under pulley 57 upward through the hollow stanchion 16 and the hollow standard 11 over pulleys 58 and 59 and thence downward to the center of the bar 23 joining arms 22. The cable 56 serves to automatically raise or lower the reflector 26 as the camera 31 is adjusted along the rods 37 and 39. The threaded rod 37 may also be connected to suitable lens focussing devices in the camera 31, if desired. The ratios of the gears 51, 52 and 54 and the diameter of the drum 55 are such as to properly elevate the reflector 26 the correct amount as the camera 31 is adjusted upward along the rods 37 and 39 whereby the angle A between the light rays 29 and 30 always remains constant. Obviously, the focal distance from the camera 31 to the object 15 may be easily regulated by rotation of the crank 38.

The operation of the above-described embodiment of the invention is as follows: The operator standing in front of the apparatus raises the transparent cover 14, places the object to be copied on the object holder 13, and lowers the cover 14 onto the object to flatten it into a substantially horizontal plane. If desired, several objects may be arranged on the holder at one time for copying at one exposure. The operator then adjusts the crank 38 until the pointer 42 is opposite the desired reduction ratio on the scale 43. As the reduction ratio, i. e., the ratio of the camera field size to the image size is determined by the focal distance from the camera lens to the object, adjustment of the camera along the supporting rods 37 and 39 and the consequent automatic positioning of the reflector 26 varies the focal distance to secure the desired ratio. Where thirty-five millimeter film is used, the usable film width is one inch and the reduction ratio indicated on scale 43 is therefore the size, in inches, of the object that may be copied. After the object and the camera are properly positioned as above described, the operator energizes suitable controls such as motor 49 to operate the camera shutter for an exposure of film and to subsequently index the film strip for the next exposure. The reflectors and lamps 20 provide ample illumination for the exposure without glare. Where the object to be copied is of such shape or size that it is desirable to have it register lengthwise rather than crosswise on the film strip, the operator rotates the camera assembly 31 through ninety degrees by virtue of the quarter-circle slots in the camera support 32. After the exposure, the object copied may be removed from the holder 13 in an obvious manner and be replaced by a further object or objects to be copied.

In the modified construction shown in Figures 4, 5 and 6, adjustment of the focal distance from the camera 31' to the object positioned on holder 76 is secured by angular rather than lineal movement of the camera 31' and reflector 26'. In this form of the apparatus, the camera supporting plate is held on trunnions 61 journaled in bosses 62 secured to the stanchions 16'. The reflector 26' is pivotally mounted at 68 on trunnions 69 in the forward ends of arms 22'. An arm 63 (see Figure 6) is secured to the trunnion 61 and is provided with a groove within which the lever 66 is adapted to slide. A plate or cover 64 is attached to the arm 63 by screws 65 to prevent lateral displacement of arm 66 from the groove. The upper extremity of arm 66 is pivoted to the bracket arm 22' at 68. A lever 70 extends upward from and is secured to the reflector 26' for controlling pivotal movement thereof. Arm 75 extends upward from the outer end of bracket arm 22' and may be integral therewith. A pair of links 73 and 74 connected respectively to the lever 66 and the arm 75 are themselves connected by a pin 72 extending through a slot 71 in the upper portion of lever 70. This arrangement of levers and links is known as a half-angle mechanism since angular movement of lever 66 on its pivot 68 causes lever 70 and the reflector 26' to move through one-half the angle traversed by lever 66. The reflector brackets 22' are arranged for vertical movement on the standards 11' on wheels 24' and 25' as above described. Likewise a drum 55' may be journaled on the stanchion 16' and provided with a cable 56' extending around pulleys 57', 58' and 59' to the support for the reflector 26'. A shaft 81 journaled on the base 10' is provided with a worm 80 engaging gear 79 on the drum 55' and a disc 82 with a turning handle 83 secured to the forward end of shaft 81. In this modification, the reduction ratio scale 77 is directly on the standard 11' and a pointer 78 is provided on the reflector bracket 22'.

The operation of the modified form of apparatus is substantially similar to the operation of the first-described embodiment. After the object is positioned in the holder 76, the camera is positioned for the proper reduction ratio by manipulation of the crank 83 which raises or lowers the reflector 26' by means of the cable 56'. As the reflector 26' is raised to increase the focal distance from the camera 31' to the object to be copied, the camera assembly is automatically tilted on a horizontal axis passing through its supporting trunnions 61 so as to be directed at the center of the reflector 26'. Likewise, the reflector is automatically adjusted angularly on trunnions 69 by means of the half-angle mechanism 67. This mechanism is such that vertical light rays from the object to be copied are reflected by the reflector 26' so as to enter the camera 31' on its optical axis for all positions of adjustment. The camera operating mechanism can be of any suitable type such as that described hereinbefore.

It will be apparent that the described forms of reflex copy device are simple in construction and economical to manufacture. The apparatus is relatively low in overall height because of the reflex principle and therefore an easily handled portable unit is provided. The interconnection between the camera support and the reflector assures accurate copy and facilitates and simplifies adjustment to secure the proper reduction ratio. The apparatus may be easily taken down for packing by the removal of standards 11 from the stanchions 16. The convenient low location of the film magazine 44 aids operation of and reloading of the camera. The construction shown and described also provides for excellent illumination of the work with minimum strain on the operator.

This invention also contemplates numerous possible modifications and variations in the described proportions and arrangements of parts. It will readily be apparent to those skilled in the art that many such changes are possible without departing from the nature and scope of the invention defined in the following claims.

The invention herein described and claimed may be manufactured and used by and for the Government of the United States of America for governmental purposes, without the payment of any royalties thereon or therefor.

What I claim is:

1. In a copying unit, the combination comprising a base and an object support thereon, a standard extending from said base, a plate supported by said standard for movement relative thereto, a camera secured to said plate for angular movement through ninety degrees with respect to said plate, a reflector supported by said standard for movement relative thereto, and means connecting said camera and said reflector for shifting one in response to movement of the other.

2. In a copying unit, the combination comprising an object support and a base therefor, a standard extending from said base, a camera supported by said standard for lineal movement transverse thereof, means including a threaded rod for moving said camera with respect to said standard, a reflector supported by said standard for movement therealong, and means extending between said threaded rod and said reflector for controlling the movement of said reflector along said standard as the camera is shifted transversely of said standard.

3. In a copying unit, the combination comprising an object support and a base therefor, a standard extending from said base, a camera supported by said standard for lineal movement transverse thereof, manually operated means for shifting said camera, a reflector supported by said standard for movement therealong and means including a cable interconnecting said shifting means and said reflector for moving said reflector along said standard as said camera is shifted whereby optical alinement of the camera with said reflector and said object support is continually maintained.

4. In a copying unit, the combination comprising an object support and a base therefor, a standard extending from said base, a camera supported by said standard for pivotal movement with respect thereto, a reflector supported by said standard for pivotal movement and for lineal movement therealong and means extending between said reflector and said camera controlling their pivotal movement in response to lineal movement of said reflector along said standard whereby optical alinement of said camera with said object support is maintained in each position of said reflector.

5. In a copying unit, the combination comprising an object support and a base therefor, a standard extending from said base, a camera supported by said standard for pivotal movement with respect thereto, a reflector supported by said standard for pivotal movement and for lineal movement therealong, manually operated means for shifting said reflector along said standard and means extending between said reflector and said camera controlling their pivotal movement as said reflector is shifted along said standard whereby optical alinement of said camera with said object support is maintained in each position of said reflector.

6. In a copying unit, the combination comprising an object support and a base therefor, a standard extending from said base, a camera supported by said standard for pivotal movement with respect thereto, a reflector supported by said standard for pivotal movement and for lineal movement therealong, and means including a half-angle mechanism extending between said reflector and said camera controlling their pivotal movement in response to lineal movement of said reflector along said standard whereby said reflector pivots through one-half the angle of pivot of said camera to maintain optical alinement of said camera with said object support.

7. In a copying unit, the combination comprising a base and an object support thereon, a pair of standards extending upward therefrom, a reflector carried by said standards and facing said support, a camera carried by said standards and facing said reflector, a pair of sources of illumination on opposite sides of said pair of standards directing light downward and forward to said object support, means including a cable interconnecting said reflector and said camera whereby movement of one controls movement of the other to secure optical alinement of said camera with said object support, and indicating means carried by one of said standards showing the position of said camera with respect to said object support.

8. In a copying unit the combination comprising a base and an object support thereon, a pair of standards extending upward therefrom, a reflector carried by said standards for pivotal movement and for lineal movement therealong, a camera supported by said standards below said reflector and facing the same, said camera being supported for pivotal movement with respect to said standards, a pair of sources of illumination on opposite sides of said pair of standards directing light downward and forward to said object support, means including a half-angle mechanism extending between said reflector and said camera controlling their pivotal movement in response to lineal movement of said reflector, and means on one of said standards for indicating the position of said reflector with respect to said object support.

9. In a copying unit, the combination comprising a base, an object support mounted on the base; a standard extending from the base, reflecting means mounted for movement on the standard and facing said support, a camera independently mounted on the standard and facing said means, said reflecting means and said camera being spaced apart and mounted for movement relative to the support and to each other, and means extending between said reflecting means and said camera and operative to effect their relative movement while maintaining optical alignment of said camera with said object support in each position of the former.

10. In a copying unit, the combination comprising a base and an object support thereon, a standard extending from the base, a camera supported by said standard for movement relative thereto, a reflector spaced from the camera and independently supported by the said standard for movement relative thereto and to said camera, a source of illumination on either side of said standard directed towards said object support, and means extending between said reflector and camera and operable to effect simultaneous relative movement thereof while maintaining optical alignment of said camera with said object support in each position of the former.

11. In a copying unit, the combination comprising an object support and a base therefor, a standard extending from said base, a camera supported by said standard for linear movement transverse thereof, a reflector spaced from the camera and independently supported by the said standard for linear movement thereon and for movement with respect to said camera, and means extending between said reflector and said camera and operable to effect their relative movement while maintaining optical alignment of said camera with said object support in each position of the former.

RUPERT H. DRAEGER.